United States Patent
Heller et al.

(10) Patent No.: US 11,047,298 B2
(45) Date of Patent: Jun. 29, 2021

(54) ASSEMBLY METHOD FOR JOINING THE TELESCOPIC ROD PART OF A VCR CONNECTING ROD

(71) Applicants: iwis motorsysteme GmbH & Co. KG, Munich (DE); AVL List GmbH, Graz (AT)

(72) Inventors: Malte Heller, Munich (DE); Stefanie Bezner, Geltendorf (DE); Siegfried Lösch, Graz (AT); Johann Felgitscher, Allerheiligen (AT)

(73) Assignees: IWIS MOTORSYSTEME GMBH & CO. KG, Munich (DE); AVL LIST GMBH, Graz (AT)

( * ) Notice: Subject to any disclaimer, the term of this patent is extended or adjusted under 35 U.S.C. 154(b) by 88 days.

(21) Appl. No.: 16/593,779

(22) Filed: Oct. 4, 2019

(65) Prior Publication Data

US 2020/0109660 A1 Apr. 9, 2020

(30) Foreign Application Priority Data

Oct. 8, 2018 (DE) .......................... 102018124781.8

(51) Int. Cl.
*F02B 75/04* (2006.01)
*F16C 7/06* (2006.01)

(52) U.S. Cl.
CPC ............. *F02B 75/045* (2013.01); *F16C 7/06* (2013.01); *F16C 2226/10* (2013.01); *F16C 2360/22* (2013.01)

(58) Field of Classification Search
CPC .... F16B 4/00; B23P 11/02; F16D 1/00; F02B 75/045; F16C 7/06; F16C 2360/22; F16C 2226/10; F16C 2226/60; B25B 27/143
See application file for complete search history.

(56) References Cited

U.S. PATENT DOCUMENTS 5,724,863 A * 3/1998 Kramer .................. F02B 41/04
                                                        123/48 R
6,604,496 B2 * 8/2003 Bartsch ................. F02B 75/045
                                                        123/78 E (Continued)

FOREIGN PATENT DOCUMENTS

AT    2016/203047       * 12/2016
WO    2016/203047 A1    12/2016

*Primary Examiner* — Lawrence Averick
(74) *Attorney, Agent, or Firm* — BakerHostetler (57) ABSTRACT

An assembly method for joining a telescopic rod part of a length-adjustable connecting rod, the method includes the following steps: providing a first section of the telescopic rod part, the first section comprising a connecting-rod eye and having a connection thread, providing a second section of the telescopic rod part, the second section comprising the piston rod, to which a piston is fixedly connected, and having a connection thread, wherein the second section has already arranged thereon at least sealing and/or supporting and/or closing elements, which are to be secured to the second section and which are to be mounted onto the piston rod and the piston, respectively, from the side of the associated connection thread, providing a tool for establishing a sufficiently strong frictional engagement with the piston rod and the piston, respectively, by means of form-fit clamping, establishing a sufficiently strong frictional engagement with the second section of the telescopic rod part by means of the tool, screw fastening the first section of the telescopic rod part to the second section of the telescopic rod part by means of the respective connection threads, applying the necessary tightening torque between the first section of the telescopic rod part and the second section of the telescopic rod part by means of the attached tool. In addition, the present invention relates to the use of a telescopic rod part of a VCR connecting rod in such a method.

10 Claims, 6 Drawing Sheets

(56) References Cited

U.S. PATENT DOCUMENTS

| | | | |
|---|---|---|---|
| 7,946,260 B2* | 5/2011 | von Mayenburg | F02D 15/02 123/48 B |
| 8,851,030 B2* | 10/2014 | von Mayenburg | F02B 75/045 123/48 B |
| 2002/0129778 A1* | 9/2002 | Bartsch | F16C 7/06 123/78 E |
| 2013/0247879 A1* | 9/2013 | von Mayenburg | F16C 7/06 123/48 B |
| 2016/0177997 A1* | 6/2016 | Ezaki | F16C 7/06 123/48 B |

* cited by examiner

ASSEMBLY METHOD FOR JOINING THE TELESCOPIC ROD PART OF A VCR CONNECTING ROD

CROSS-REFERENCE TO RELATED APPLICATIONS

This application claims priority to foreign German patent application No. DE 102018124781.8, filed on Oct. 8, 2018, the disclosure of which is incorporated by reference in its entirety.

FIELD OF THE INVENTION

The present invention relates to an assembly method for joining a telescopic rod part of a length-adjustable connecting rod.

BACKGROUND

The thermal efficiency n of Otto engines depends on the compression ratio ε, i.e. the ratio of the total volume before compression to the compression volume=(stroke volume $V_h$+compression volume $V_c$)/compression volume $V_c$). The thermal efficiency increases with increasing compression ratio. The increase in thermal efficiency via the compression ratio is degressive, but still relatively pronounced in the range of values common today (ε=10 . . . 14).

In practice, the compression ratio cannot be increased arbitrarily. For example, an excessively high compression ratio leads to knocking in Otto engines. In this case, the mixture ignites due to the increase in pressure and temperature during compression and not due to the ignition spark. This premature combustion not only leads to unsteady running, but may also cause damage to components.

The compression ratio at which knocking occurs depends, among other things, on the operating point (n, T, throttle position) of the engine. In the partial load range, higher compression is possible. Therefore, efforts are made to adapt the compression ratio to the respective operating point. In this respect, various development approaches exist. In the present case, the compression ratio is intended to be adjusted by the connecting-rod length. The connecting-rod length influences the compression volume. The stroke volume is determined by the position of the crankshaft journal and the cylinder bore. A short connecting rod therefore leads to a lower compression ratio than a long connecting rod with otherwise identical geometric dimensions (crankshaft, cylinder head, valve controller, etc.).

In the present case, the connecting-rod length is to be varied hydraulically between two positions. The mode of operation will be explained briefly hereinafter. The entire connecting rod consists of several parts, the change in length being effected by a telescopic mechanism. The connecting rod comprises a double-acting hydraulic cylinder. The connecting-rod small end (piston pin) is connected to a piston rod. The piston is guided in an axially displaceable manner in a cylinder, which is arranged in the connecting-rod part with the connecting-rod big end (crankshaft journal). The piston separates the cylinder into two chambers (upper and lower pressure chamber). The two chambers are supplied with a hydraulic medium, in particular engine oil, via check valves. If the connecting rod is at the long position, there will be no oil in the upper pressure chamber. The lower pressure chamber, however, is completely filled with oil. During operation, the connecting rod is alternatingly subjected to tension and pressure due to the gas forces and the mass forces. At the long position, a tensile force is absorbed by the mechanical contact with an upper stop of the piston. This does not lead to a change in the connecting-rod length. A pressure force applied is transmitted via the piston area to the oil-filled lower chamber. Since the check valve of this chamber prevents a return flow of oil, the oil pressure increases. The connecting-rod length does not change. The connecting rod is hydraulically locked in this direction.

At the short position, the conditions are reversed. The lower chamber is empty, the upper chamber is filled with oil. A tensile force causes an increase in pressure in the upper chamber. A pressure force is absorbed by a mechanical stop.

The connecting-rod length can be adjusted in two steps by emptying one of the two chambers. In so doing, a respective one of the two feed check valves is bridged by a return passage associated therewith. Oil can flow through this return passage, independently of the pressure difference between the pressure chamber and the supply section. The respective check valve is thus rendered ineffective.

The two return passages are opened or closed by a control valve, precisely one return passage at a time being open and the other one closed. The actuator for switching the two return passages is controlled hydraulically by the supply pressure. Oil supply takes place through the lubrication of the connecting-rod bearing. This requires an oil feed-through from the crankshaft journal via the connecting-rod bearing to the connecting rod.

Switching takes place by purposefully emptying one of the two pressure chambers, making use of the mass forces and of the gas forces acting on the connecting rod, the respective other pressure chamber being supplied with oil through a feed check valve and hydraulically blocked.

A telescopic connecting rod for adjusting the compression ratio in a combustion engine is known e.g. from DE 10 2017 217 474 A1. In the case of this known structural design, the connecting-rod small end has formed thereon a sleeve-shaped piston rod having secured thereto a hydraulic cylinder by means of a clamping screw. The piston rod passes through a sealing sleeve, which delimits the pressure chamber in the lower part of the connecting rod, and is sealed. Sealing is effected in the manner of a rod seal, similar to a hydraulic cylinder. The entire structural design of the connecting rod necessitates that the sealing sleeve is pushed onto the piston rod before the hydraulic cylinder and the clamping screw are fixed to the connecting-rod small end. The clamping screw must be tightened with a sufficiently high torque, so that the screw connection will withstand the high dynamic loads during operation, thus preventing torsional forces from acting on the connecting-rod small end during future operation. Such constructed upper, telescopic connecting-rod parts of a VCR connecting rod are critical devices, which have to withstand very high loads, both with regard to power transmission and hydraulic conditions, and which are nevertheless subject to the high cost pressure in the automotive sector. The aim is therefore to provide a simplified assembly method.

SUMMARY OF THE INVENTION

Hence, it is the object of the present invention to accomplish, by means of an improved assembly method, a simple structural design of the telescopic rod part of a length-adjustable connecting rod.

According to the present invention, the above-mentioned object is achieved by an assembly method for joining the telescopic rod part of a VCR connecting rod, the method comprising the following steps:

providing a first section of the telescopic rod part, the first section comprising a connecting-rod eye and having a connection thread, providing a second section of the telescopic rod part, the second section comprising a piston rod, to which a piston is fixedly connected, and having a connection thread, wherein the second section of the telescopic rod part has already arranged thereon at least the sealing and/or supporting and/or closing elements, which are to be secured to the second section and which are to be mounted onto the piston rod and the piston, respectively, from the side of the associated connection thread, providing a tool for establishing a sufficiently strong frictional engagement with the piston rod and the piston, respectively, by means of form-fit clamping, establishing a sufficiently strong frictional engagement with the second section of the telescopic rod part by means of the tool, screw fastening the first section of the telescopic rod part to the second section of the telescopic rod part by means of the respective connection threads, applying the necessary tightening torque between the first section of the telescopic rod part and the second section of the telescopic rod part by means of the clamped-on tool.

To begin with, it should be pointed out that the telescopic rod part of the VCR connecting rod has a structural design which differs from that in DE 10 2017 217 474 A1, since, in the present case, the telescopic piston rod, which, in the assembled condition, is sealingly guided in the lower rod part of the telescopic connecting rod for varying the compression ratio of an internal combustion engine ("variable compression ratio"—the connecting rod will therefore also be referred to as "VCR connecting rod" hereinafter), forms a unit with the piston and not with the connecting-rod eye. Due to the fact that, in the case of this concept, the piston always has a larger diameter than the piston rod, all additional components to be arranged between the connecting-rod eye and the largest diameter of the piston must at least be pre-mounted from the thread side. This applies, for example, to a sealing device which closes the cylinder chamber in the lower part of the connecting rod and which may also be configured to guide and seal the piston rod. However, this may also apply to at least the upper piston seal ring and a possible support device for the seal. For this reason, a division between the connecting-rod eye and the piston is necessary. In the present case, this division takes place as close as possible to the connecting-rod eye and preferably in a section that lies outside the lower rod part of the VCR connecting rod at the switching positions of the VCR connecting rod. In order to avoid asymmetries on the piston rod and the piston, e.g. due to arranged wrench flats for applying a tightening torque, the present invention provides a tool, which is connected to the piston rod and the piston, respectively, by means of frictional engagement and form-fit clamping. The frictional engagement is, of course, strong enough for allowing the respective tightening torque to be applied. Due to the compact structural design of the telescopic rod part, the functional surfaces in question are almost exclusively functional surfaces that should not be affected by this process, and this is why form-fit clamping takes place. An exact adaptation to the contour to be clamped (especially in a longitudinal direction) is possible. Therefore, no additional portions for attaching the tool (e.g. wrench flat, hexagon socket, etc.) need to be provided. The structural design of the telescopic rod part additionally has the advantage that the piston rod and the piston can be configured in one piece and are therefore very robust and compact, and, consequently, a failure of this unit is not to be expected. The counter-torque is applied to the connecting-rod eye, either through the connecting-rod eye itself or through wrench flats provided on the connecting-rod eye.

Preferably, the piston on the second section of the telescopic rod part may comprise, on the side facing away from the connection thread, a shoulder for attaching a sealing element and/or a supporting element, and the frictional engagement may be established with the shoulder. The respective force is thus applied to the front end of the second section of the telescopic rod part, preferably on a cylindrical shoulder used for mounting other elements. Hence, the actual guide section of the piston is here not involved, so that the demands on a damage-free frictional connection can be less strict. In particular, if a support element for the front piston seal is applied to this shoulder, these demands will be least strict.

According to an advantageous embodiment, the tool provided may be a collet chuck, the frictional engagement with the shoulder being established by means of the collet chuck. This leads to a double advantage. On the one hand, the step of the shoulder may be used as a stop when insertion into the collet chuck takes place, a precisely defined clamping position being thus given. On the other hand, making use of a collet chuck, a precisely defined frictional engagement can be established with simple means. A collet chuck is usually tensioned via a clamping mechanism pushed over the collet chuck sleeve. Clamping through the clamping mechanism is adjustable and detectable, so that reproducible clamping conditions can be produced. Collet chucks are well known clamping devices, e.g. for lathes. Collet chucks will leave on the section to be clamped only minor marks, which have only little influence on the surface quality. If these marks do not have any influence on the functionality, e.g. in the event that a supporting element for the seal is applied or pressed on, no further measures need to be taken to protect the surface.

According to an advantageous embodiment, the frictional engagement between the shoulder and the tool may be released, when the necessary tightening torque has been applied, and a sealing element and/or a supporting element may be mounted on the shoulder after the latter has been released. Hence, the seal in question is the front piston seal.

According to a further variant, the tool provided is a tension clamp, the tensioning width of this tension clamp corresponding at most to the available clamping width on the second section of the telescopic rod part. This allows an adaptation to circumferential areas of the piston rod and the piston, respectively, that may also be slightly further away from the free end. Also an adaptation to the contour (especially in a longitudinal direction) of the clamping area can be accomplished by means of such a tension clamp, so that there will be little negative influence on the surface.

In this case, it will be of advantage, when, according to a variant, the clamping surface of the tension clamp is made of a material that is softer than the material forming the clamping area of the second section of the telescopic rod part. In this way, the frictional engagement will be established on the second section of the telescopic rod part even more carefully as regards surface damage.

In addition, the clamping area of the second section of the telescopic rod part may also be provided on the piston guide section located between a front and a rear piston seal, and the clamping surface of the tool may be made of a material that is softer than the material forming the guide section of the piston. It is not absolutely necessary that the front piston seal has already been mounted, since it may still be applied when the first section of the telescopic rod part and the second section of the telescopic rod part have been connected. The guide section of the piston is usually manufactured with high precision and guided in the cylinder of the second rod part of the VCR connecting rod. It is therefore important that the frictional engagement does not lead to any negative influences on the surface, which might impair this function. The use of a correspondingly softer material will here be useful. Preferably, the clamping surface of the tool is precisely adapted to the contour of the guide section.

It goes without saying that the whole tool may be made of a material that is softer than the material forming the clamping area on the telescopic rod part. According to an embodiment it is, however, preferred that the tool is provided with a softer material, preferably a sufficiently solid elastomeric material, in the area of its clamping surface. In this context, it will also be advantageous, if this is done in an exchangeable manner, so that, after certain mounting cycles, an exchange can be carried out so as to maintain the good surface qualities on the telescopic rod part. The preferred use of an elastomeric material will generally also help establishing a suitable frictional engagement through higher coefficients of friction.

According to an embodiment, the guide section may have a step and/or a groove and, when the necessary frictional engagement is being established, the softer material may act as a compensating element for the surface contour of the guide section. In the case of pistons subjected to very high pressures, as is the case with a telescopic VCR connecting rod, it may be advantageous not to configure the guide section as a continuous section, but to provide a drain groove and hole therein, so that hydraulic fluid entering between the seal can be discharged. The softer material helps to ensure that the clamping surface of the tool will enter into contact with the contour of the piston and that a sufficiently strong frictional engagement will be established.

According to an advantageous embodiment, the tension clamp may comprise two jaws, which are arranged such that they are pivotable relative to each other, and a distance of the pivot axle from the axis of the telescopic rod part may be smaller than the diameter of the clamping area of the rod part, and, offset relative to the dividing plane of the jaws, a holding arm may be arranged, whose holder distance from the axis of the telescopic rod part is larger than the diameter of the clamping area of the rod part. Clamping of the jaws on the telescopic rod part is to be effected by means of elements, which are arranged as close as possible to the clamping area. In this respect, it will be advantageous when the pivot axle is arranged as close as possible to the clamping area. Opposite the clamping axis, e.g. a clamping screw, etc. will then be provided. Also the latter may be arranged as close as possible to the clamping area, so that a uniform clamping force can be applied more easily. In contrast to this, the retaining force or the torsional force to be applied should be applied as far away from the axis of the telescopic rod part as possible, and this is why a respective holding arm is arranged offset relative to the dividing plane of the jaws. The holding arm is therefore preferably configured as a solid extension of a jaw. Due to this distance, a correspondingly large lever arm for applying the desired force for the necessary tightening torque is available.

According to a further variant, the tension clamp may comprise a wire strap loop, which is adjustable with respect to its clamping circumference by means of an adjusting element, and the wire strap loop may be positioned on the clamping area of the second section of the telescopic rod part for establishing a sufficiently strong frictional engagement. Wire strap loops are standard elements that are frequently used for attaching hose elements or sleeves. The operating principle is similar to that of a pipe clamp. Here, oblique slots, which are intended to form part of an internal thread that is engaged by the thread of a screw, are punched into a metal strip. The screw is attached to the metal strip by means of a special housing and is in engagement with these oblique slots. It is also possible to configure the metal strip in the manner of a rack. Such a wire strap loop need not necessarily extend over the entire clamping area, but may be attached to a suitable base, so that the two ends of the wire strap will be spaced apart. In this case, one end may be fixed and only the other end may be adjustable. Alternatively, also both ends may be adjustably attached to the base. The tightening torque of the screw may also be used for deriving therefrom the respective clamping force.

In summary, the present invention has the advantage that, by firmly pressing-on the tool, a clamping force will be generated, which is so high that the frictional force between the telescopic rod part of the VCR connecting rod will be suffice to transmit the necessary tightening torque.

The use of wrench flats, e.g. a dihedron, on the first section of the rod part is not necessary, and, consequently, the first section can be configured rotationally symmetrical and therefore in a more cost-effective manner. There are no negative effects and alignment, which would be required with a dihedron, is not necessary.

When a softer covering material is used on the tool or for the tool itself, there will be no scratches or sheared-off areas on the telescopic rod part. In case of wear, only the covering material will have to be replaced. Chips that may affect the seals later on are not produced. The variant according to which form-fit clamping takes place on a shoulder on the rod part side facing away from the connecting thread is particularly advantageous. Possible wear caused by the clamping will only occur on the shoulder, onto which, preferably, a supporting element for seal protection will be pressed on subsequently. Hence, easy mounting of the supporting element is still possible. In addition, the distance between the seals on the piston can be reduced considerably, whereby material and costs will be saved.

The present invention also relates to the use of a telescopic rod part in a method having the above-described features or a method according to one of the claims.

BRIEF DESCRIPTION OF THE DRAWINGS

In the following, the present invention will be described in more detail making reference to non-limiting embodiments of the present invention, which are shown in the drawings, in which.

DETAILED DESCRIPTION

Figure 1:
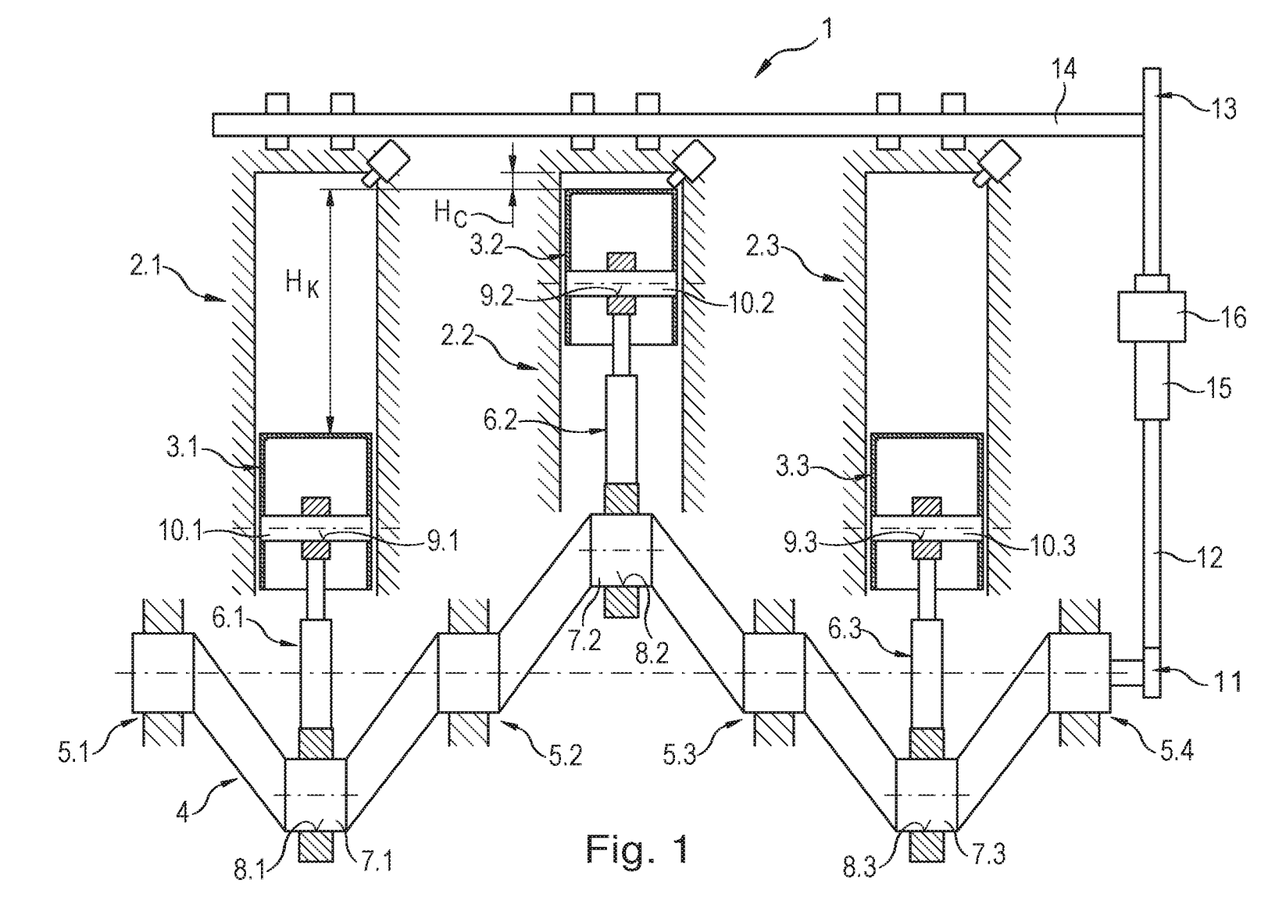
FIG. 1 shows a schematic cross-section through a combustion engine.

FIG. 1 shows a combustion engine (Otto engine) 1 in a schematic representation. The combustion engine 1 has three cylinders 2.1, 2.2 and 2.3, with a respective reciprocating piston 3.1, 3.2, 3.3 moving up and down in each of these cylinders. Furthermore, the combustion engine 1 comprises a crankshaft 4, which is rotatably supported by means of crankshaft bearings 5.1-5.4. The crankshaft 4 is connected to the respective reciprocating piston 3.1, 3.2 and 3.3 by means of connecting rods 6.1, 6.2 and 6.3. The crankshaft 4 is provided with an eccentrically arranged crankshaft journal 7.1, 7.2 and 7.3 for each connecting rod 6.1, 6.2 and 6.3. The connecting-rod big end 8.1, 8.2 and 8.3 of the connecting rods 6.1, 6.2, 6.3 is supported on the respective crankshaft journal 7.1, 7.2 and 7.3 associated therewith. The connecting-rod small end 9.1, 9.2 and 9.3 of the connecting rods 6.1, 6.2, 6.3 is supported on a respective piston pin 10.1, 10.2 and 10.3 and thus pivotably connected to the reciprocating piston 3.1, 3.2 and 3.3 associated therewith. The terms connecting-rod small end 9.1, 9.2. and 9.3 and connecting-rod big end 8.1, 8.2 and 8.3 disclose neither an absolute nor a relative assignment of size, but they only serve to distinguish the components and to assign them to the combustion engine shown in FIG. 1. Accordingly, the dimensions of the diameters of the connecting-rod small ends 9.1, 9.2, 9.3 may be <, = or > than the dimensions of the diameters of the connecting-rod big ends 8.1, 8.2 and 8.3.

The crankshaft 4 is provided with a crankshaft sprocket 11 and coupled to a camshaft sprocket 13 by means of a timing chain 12. The camshaft sprocket 13 drives a camshaft 14 with its associated cams for operating the intake and exhaust valves (not shown in detail) of each cylinder 2.1, 2.2 and 2.3. The slack span of the timing chain 12 is tensioned by means of a pivotably arranged tensioning rail 15, which is pressed thereagainst by means of a chain tensioner 16. The taut span of the timing chain 12 can slide along a guide rail. The essential mode of operation of the timing drive, including fuel injection and spark plug ignition, will not be explained in more detail and is assumed to be known. The eccentricity of the crankshaft journals 7.1, 7.2 and 7.3 determines the stroke $H_K$ to a significant extent, especially if, as in the present case, the crankshaft 4 is arranged exactly centrically below the cylinders 2.1, 2.2 and 2.3. In FIG. 1, the reciprocating piston 3.1 is shown at its lowermost position, whereas the reciprocating piston 3.2 is shown at its uppermost position. The difference is, in the present case, the stroke $H_K$. The remaining height $H_c$ (cf. cylinder 2.2) is the remaining compression height in the cylinder 2.2. In connection with the diameter of the reciprocating piston 3.1, 3.2 or 3.3 and of the associated cylinders 2.1, 2.2 and 2.3, respectively, the stroke volume $V_h$ results from the stroke $H_K$ and the compression volume $V_c$ results from the remaining compression height $H_c$. It goes without saying that the compression volume $V_c$ depends to a great extent on the structural design of the cylinder cover. The compression ratio c results from this volume $V_h$ and $V_c$. In detail, the compression ratio results from the sum of the stroke volume $V_h$ and the compression volume $V_c$ divided by the compression volume $V_c$. Today the usual Otto engine values for c are between 10 and 14.

In order to allow the compression ratio c to be adapted depending on the operating point (n, T, throttle position) of the combustion engine 1, the connecting rods 6.1, 6.2 and 6.3 are configured to be adjustable in length (so-called VCR connecting rods) according to the present invention. This allows a higher compression ratio in the partial load range than in the full load range.

Figure 2:
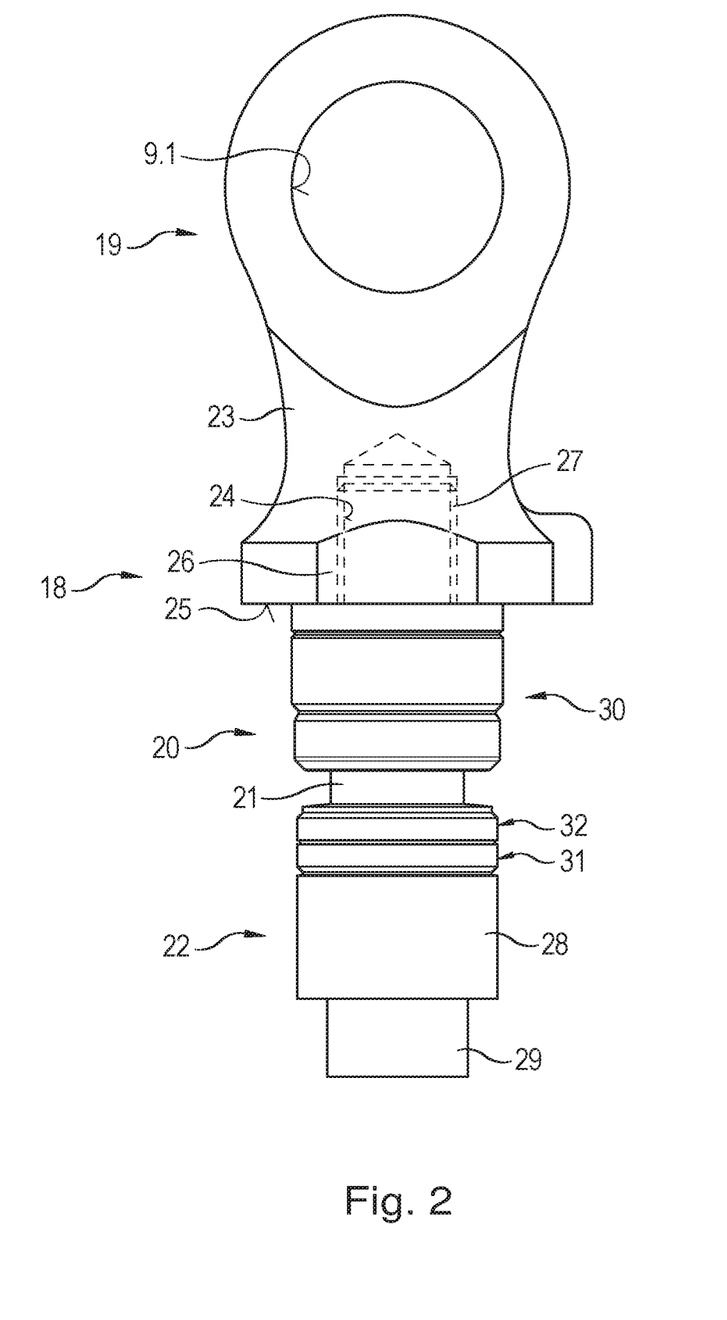
FIG. 2 shows a variant of an assembled telescopic rod part of a VCR connecting rod (without front piston seal)

FIG. 2 shows, at least partially, the telescopic rod part 18 of a connecting rod 6.1. The telescopic rod part 18 comprises a first section 19 with the above-mentioned connecting-rod small end 9.1 as well as a second section 20 with a piston rod 21 and a piston 22 attached to the piston rod 21. The movement of the telescopic rod part 18 relative to the second connecting-rod part, i.e. the lower connecting-rod part with the connecting-rod big end 8.1, which is not shown in detail, is effected by means of a cylinder-piston unit with the piston 22, which is arranged in a respective complementary cylinder in the second connecting-rod part.

The first section 19 or connecting-rod head comprises, in addition to the connecting-rod small end 9.1, a foot 23 provided with an internal thread (connection thread 24) cut into the foot 23 from the end face 25 of the latter. On the outside, the foot 23 is provided with wrench flats 26 for applying a tool. The entire first section 19 remains, in the assembled state, outside the second connecting-rod part, which is not shown. The second section 20 comprises the piston rod 21, the external thread (connection thread 27) arranged on the upper end of the piston rod, and the piston 22 fixedly attached to the lower end of the piston rod 21. The piston 22 has a central guide section 28 as well as respective cylindrical shoulders 29 located before and after the guide section 28. The piston 22 is a double-acting piston with front and rear piston areas. The respective piston areas cooperate with a pressure chamber in the cylinder of the lower part of the connecting rod, which is not shown, the pressure chamber being delimited by the guide surface 28 (and possibly by seals). The shoulder 29 on the side of the guide section 28 facing the connection thread 27 is hidden by elements that will be described in more detail hereinafter. The front shoulder 29, which is shown in the figure, also forms the front end of the second section 20. The two shoulders 29 as well as the guide section 28 are larger in diameter than the diameter of the piston rod 21. The external diameter of the connection thread 27 is smaller than the external diameter of the piston rod 21. In the present case, the entire second section 20 (piston rod 21, cylinder 22 and connection thread 27) is made of one piece or is inseparably connected. Therefore, all additional elements to be arranged between the first section 19 and the guide section 28 of the piston 22 must at least be pre-assembled prior to joining the first section 19 and the second section 20. These elements are, for example, the piston-rod sealing unit 30 as well as the upper piston seal 31 and the associated support ring 32. The pistonrod sealing unit 30 is screwed into the lower part of the connecting rod during mounting to the lower part of the connecting rod, which is carried out later on, and therefore has a suitable screw-in thread. Inside, the piston-rod sealing unit 30 forms the respective rod seals used for telescopically displacing the piston rod 21 in a sealed manner. The piston-rod sealing unit 30 thus closes the cylinder in the lower part of the connecting rod for arranging the piston 22.

Figure 3:
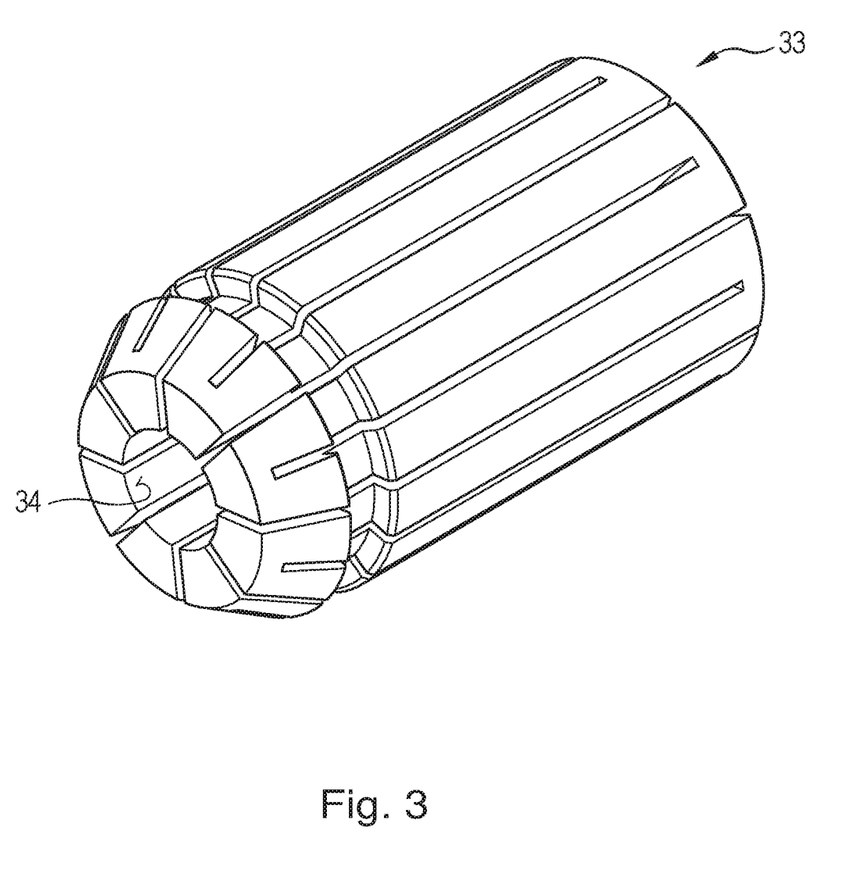
FIG. 3 shows a variant of a collet chuck sleeve in a perspective view.

In the following, the assembly of the first section 19 and the second section 20 will be explained in more detail. The first section 19 is provided and the second section 20 is equipped in a suitable manner with the elements to be pre-assembled, viz. the piston-rod sealing unit 30, the piston seal 31 and the support ring 32. Subsequently, the connection thread 27 of the second section 20 is screwed into the connection thread 24 of the first section 19 until the end face of the thread 27 strikes thereagainst. Then, the thus pre-assembled telescopic rod part 18 is clamped in position by means of the collet chuck sleeve 33 shown in FIG. 3 and the other elements of the collet chuck, which are not shown. To this end, the front shoulder 29, which has not yet arranged thereon a piston seal 31 and a support ring 32, is inserted into the front clamping opening 34 of the collet chuck sleeve 33. The diameter of the clamping opening 34 and the external diameter of the shoulder 29 are adapted to each other in a suitable manner. Making use of the collet chuck, a sufficiently strong clamping force is applied, so that a frictional engagement between the tool consisting of the collet chuck and the circumferential surface of the front shoulder 29 is given. The frictional engagement is so strong that a torque between the first section 19 and the second section 20 can then be applied by means of the wrench flats 26, so that the desired tightening torque will be accomplished. According to an embodiment, the latter may e.g. be 80 Nm. Clamping by the collet chuck sleeve 33 only causes minor pressure marks on the shoulder 29, which are nothing out of the common when collet chucks are used. These pressure marks will not impair the subsequent mounting of the piston seal 31 and the support ring 32 as soon as the collet chuck has been removed from the shoulder 29. Once these additional elements have been attached, a fully assembled telescopic rod part 18 is obtained. The tightening torque is sufficiently high to ensure reliable operation of this rod part 18. This kind of assembly is in particular possible, since no wrench flats are provided on the piston rod 21 or the piston 22, since the latter are preferably configured in one piece and since the interface between the first section 19 and the second section 20 is located outside the lower part of the connecting rod or between the piston-rod sealing unit 30 and the end of the connection thread 27.

Due to the size of the piston-rod sealing unit 30, the available displacement length and the size of the piston 22, the piston rod 21 can, in many cases, only exceptionally be used for establishing the suitable frictional engagement, and this is why the frictional engagement must take place in the area of the piston 22. However, also the piston has sensitive surfaces, so that only tools can be used that allow a suitable form-fit clamping of the cylindrical surfaces.

Figure 4:
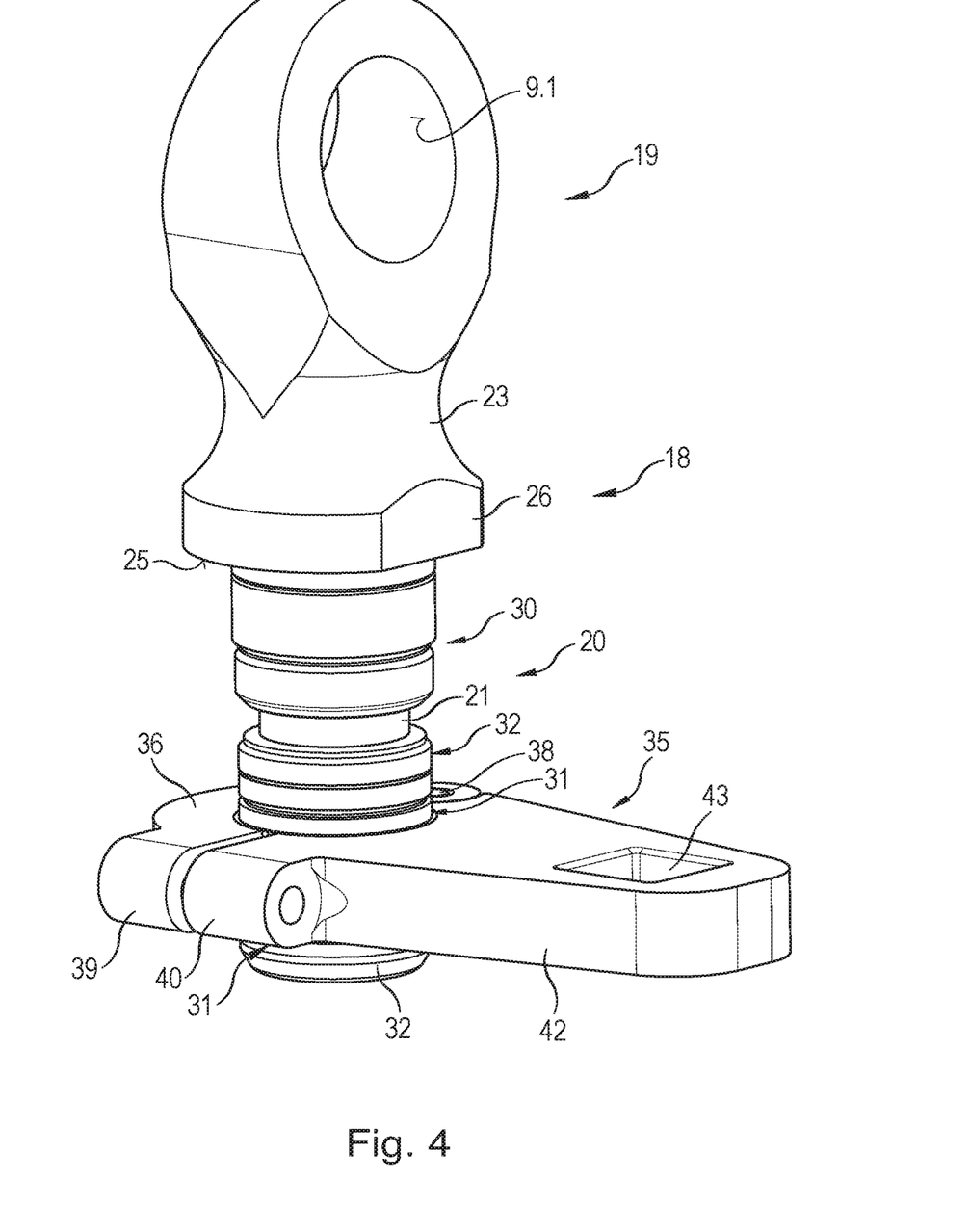
FIG. 4 shows a perspective view of a telescopic rod part having a tension clamp attached thereto.
Figure 5:
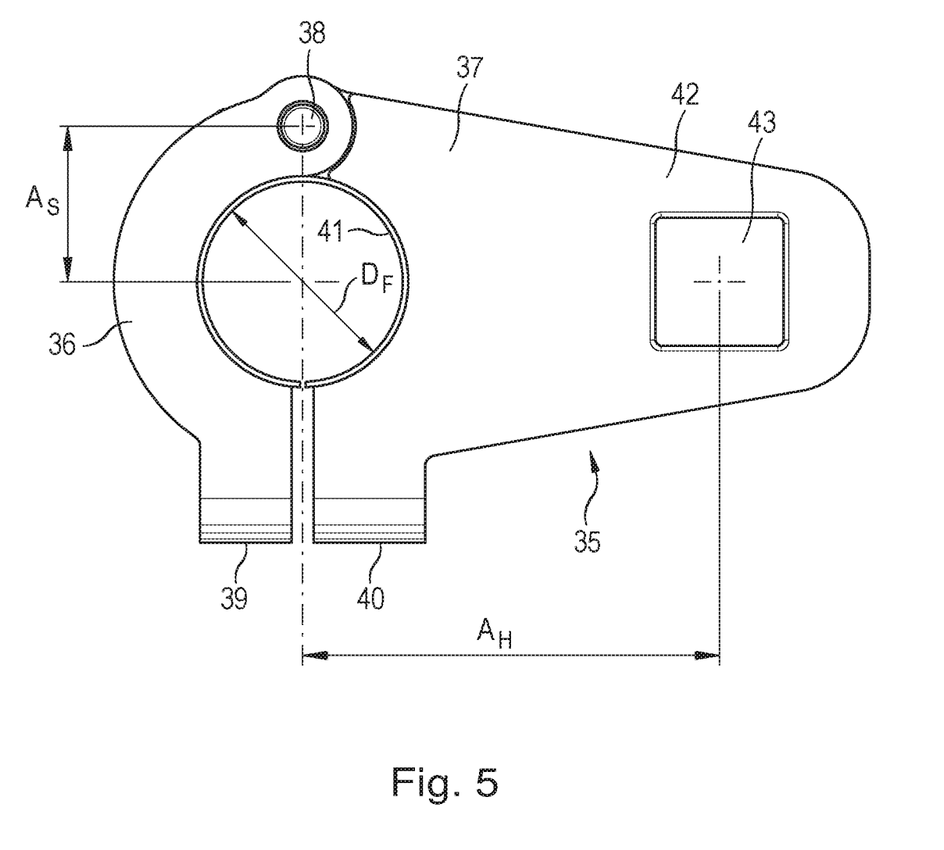
FIG. 5 shows the tension clamp according to FIG. 4 in a top view.

Making reference to FIGS. 4 and 5, a second variant of the tool and the assembly method will now be explained in more detail.

The telescopic rod part 18 is identical to the preceding embodiment. The only exception is that the respective associated piston seal 31 and the respective support ring 32 are already arranged on the front shoulder 29. The area used as a clamping area is not the circumferential surface of the shoulder 29, but the surface of the guide section 28 of the piston 22. A special tension clamp 35 has been provided, so that this functional surface will not get damaged when the necessary frictional engagement is established. The tension clamp has a first jaw 36 and a second jaw 37. The jaws 36 and 37 are pivotably connected by means of a pivot axle 38. On the side opposite the pivot axle 38, both jaws 36 and 37 are provided with clamping lugs 39 and 40. A clamping device can be inserted into the clamping lugs 39 and 40 and used for applying a suitable clamping force. For example, the clamping lug 39 may be provided with a thread, while the clamping lug 40 only has a throughhole for a screw. The clamping surface of the tension clamp 35 is provided with a layer 41 of softer material. This is preferably a sufficiently strong, rubber-elastic plastic material, so as to prevent surface damage to the piston 22. The layer 41 can be replaced when worn. The clamping surface of the tension clamp 35 can be adapted to the contour of the piston 22, in particular the guide section 28, since the guide section 28 may be divided into two guide areas with an intermediate drain groove with a leakage hole. A suitably resilient layer 41 used as a compensation element will be able to compensate this contouring of the guide section 28. The second jaw 37 has arranged thereon a holding arm 42 provided with a retaining hole 43. The retaining hole 43, which is square in cross-section in the present case, has inserted therein a suitable holding element or an element for applying a torque. In order to generate a good clamping effect, the distance $A_S$ between the pivot axle 38 and the axis of the guide section 28 is smaller than the diameter $D_F$ of the guide section 28.

Likewise, also the distance of the clamping lugs 39 and 40 from the axis of the guide section 28 is as small as possible. This leads to a good clamping force, since, with these distances, elastic deformations of the tension clamp 35 will not yet have such a strong effect on the clamping surface. The clamping surface is adapted as precisely as possible to the cylindrical shape of the guide section 28. The width of the tension clamp 35 is selected such that the latter will fit precisely between the piston seals 31 without damaging them. In order to generate a good holding torque, the distance $A_H$ between the axis of the guide section 28 and the effective center of the retaining hole 43 is larger than the diameter $D_F$ of the guide section 28 and thus also larger than the distance $A_S$.

Preferably, the distance $A_H$ may be approximately twice the diameter $D_F$.

Figure 6:
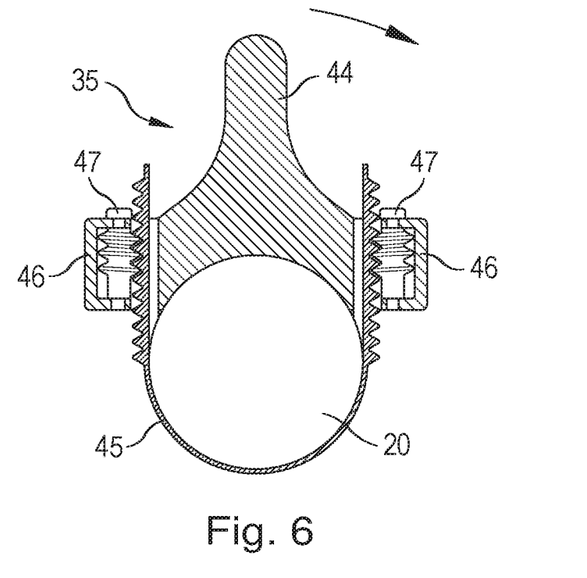
FIG. 6 shows a schematic cross-sectional representation of a tension clamp with a wire strap loop.

Making reference to FIG. 6, a further embodiment of a tension clamp 35, which can also be used for the assembly method according to the present invention, will now be explained in more detail. The tension clamp 35 shown in FIG. 6 comprises a holding arm 44 having attached thereto a wire strap loop 45. The structural design and the function of wire strap loops are well known. Wire strap loops are often used as pipe clamps. In the present case, the wire strap loop 45 is not fully closed, but part of the clamping area is given by the inner contouring of the holding arm 44. The two free ends of the wire strap loop 45 are each arranged in the respective lateral projection 46 associated therewith. In the projections 46, suitable adjustment mechanisms 47 are arranged, by means of which the loop width of the wire strap loop 45 can be adjusted. The adjustment mechanisms 47 are primarily screws whose thread engages on one side a complementary profile of the wire strap loop 45. This profile may be prominent teeth, similar to a rack with helical teeth, or suitable slot openings in the wire strap loop 45. The variant shown in FIG. 6 allows adjustment at both ends of the wire strap loop 45. To protect the surfaces, a layer of a softer, gentle material may be used between the wire strap loop 45 and the second section 20. Clamping may be effected at the shoulder 29, the guide section 28 or the piston rod 21.

Figure 7:
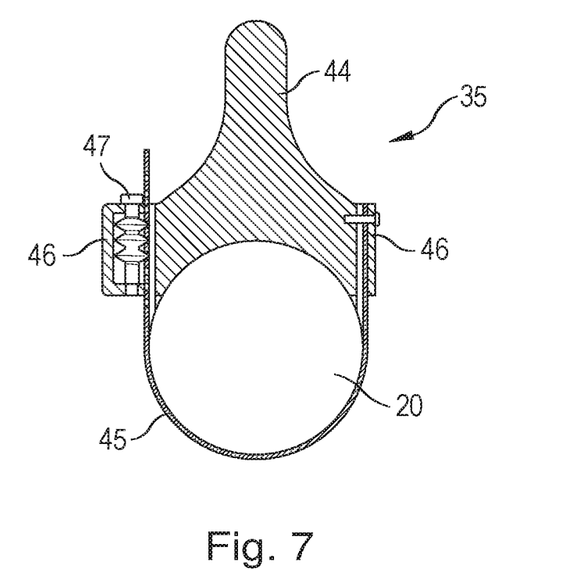
FIG. 7 shows a schematic cross-sectional representation of a variant of a tension clamp with a wire strap loop.

Making reference to FIG. 7, a second variant of a tension clamp 35 will now be explained in more detail. This second variant is similar to the preceding embodiment, and this is why the same reference numerals are used for elements producing the same effect and having the same structural design. Only the essential differences will be dealt with hereinafter and supplementary reference will be made to the above statements.

The variant shown in FIG. 7 uses again a wire strap loop 45. The only difference is that the latter is anchored on one side thereof in one of the projections 46 and is therefore not adjustable. Adjustment takes place on the opposite side by means of the known adjustment mechanism 47.

LIST OF REFERENCE NUMERALS

1 combustion engine
2.1, 2.2, 2.3 cylinder
3.1, 3.2, 3.3 reciprocating piston
4 crankshaft
5.1, 5.2, 5.3, 5.4 crankshaft bearing
6.1, 6.2, 6.3 connecting rod
7.1, 7.2, 7.3 crankshaft journal
8.1, 8.2, 8.3 connecting-rod big end
9.1, 9.2, 9.3 connecting-rod small end
10.1, 10.2, 10.3 piston pin
11 crankshaft sprocket
12 timing chain
13 camshaft sprocket
14 camshaft
15 tensioning rail
16 chain tensioner
18 telescopic rod part
19 first section
20 second section
21 piston rod
22 piston
23 foot
24 connection thread
25 end face
26 wrench flat
27 connection thread
28 guide section
29 shoulder
30 piston-rod sealing unit
31 piston seal
32 support ring
33 collet chuck sleeve
34 collet chuck opening
35 tension clamp
36 first jaw
37 second jaw
38 pivot axle
39 clamping lug
40 clamping lug
41 layer
42 holding arm
43 retaining hole
44 holding arm
45 wire strap loop
46 projection
47 adjustment mechanism
$A_H$ distance
$A_S$ distance
$D_F$ diameter guide section

The invention claimed is:

1. An assembly method for joining a telescopic rod part of a length-adjustable connecting rod, the method comprising the following steps:
   providing a first section of the telescopic rod part, the first section comprising a connecting-rod eye and having a connection thread,
   providing a second section of the telescopic rod part, the second section comprising a piston rod, to which a piston is fixedly connected, and having a connection thread, wherein the second section of the telescopic rod part has already arranged thereon at least sealing and/or supporting and/or closing elements, which are to be secured to the second section and which are to be mounted onto the piston rod and the piston, respectively, from the side of the associated connection thread,
   providing a tool for establishing a sufficiently strong frictional engagement with the piston rod and the piston, respectively, by means of form-fit clamping,
   establishing a sufficiently strong frictional engagement with the second section of the telescopic rod part by means of the tool,
   screw fastening the first section of the telescopic rod part to the second section of the telescopic rod part by means of the respective connection threads, and
   applying the necessary tightening torque between the first section of the telescopic rod part and the second section of the telescopic rod part by means of the attached tool.

2. The assembly method according to claim 1, wherein the piston on the second section of the telescopic rod part comprises, on the side facing away from the connection thread, a shoulder for attaching a sealing element and/or a supporting element and that the frictional engagement is established with the shoulder.

3. The assembly method according to claim 2, wherein the tool provided is a collet chuck and that the frictional engagement with the shoulder is established by means of the collet chuck, wherein, preferably, the frictional engagement between the shoulder and the tool is released, when the necessary tightening torque has been applied, and a sealing element and/or a supporting element is mounted on the shoulder after the latter has been released.

4. The assembly method according to claim 1, wherein the tool provided is a tension clamp, the tensioning width of this tension clamp corresponding at most to the available clamping width on the second section of the telescopic rod part, wherein, preferably, at least one clamping surface of the tension clamp is made of a material that is softer than the material forming the clamping area of the second section of the telescopic rod part.

5. The assembly method according to claim 1, wherein the clamping area of the second section of the telescopic rod part is provided on a guide section of the piston located between a front and a rear piston seal, and that the clamping surface of the tool is made of a material that is softer than the material forming the guide section of the piston.

6. The assembly method according to claim 1, wherein in the area of its clamping surface, the tool is provided with a softer material, preferably a sufficiently solid elastomeric material.

7. The assembly method according to claim 4, wherein the guide section has a step and/or a groove and that, when the necessary frictional engagement is being established, the softer material acts as a compensating element for the surface contour of the guide section.

8. The assembly method according to claim 4, wherein the tension clamp comprises two jaws, which are arranged such that they are pivotable relative to each other, that a distance ($A_S$) of the pivot axle from the axis of the telescopic rod part is smaller than the diameter ($D_F$) of the clamping area of the telescopic rod part and that, offset relative to the dividing plane of the jaws, a holding arm is arranged whose holder distance ($A_H$) from the axis of the telescopic rod part is larger than the diameter ($D_F$) of the clamping area of the telescopic rod part.

9. The assembly method according to claim 4, wherein the tension clamp comprises a wire strap loop, which is adjustable with respect to its clamping circumference by means of an adjusting element, and that the wire strap loop is positioned on the clamping area of the second section of the telescopic rod part for establishing a sufficiently strong frictional engagement.

10. The use of a telescopic rod part of a length-adjustable connecting rod in a method according to claim 1, wherein the telescopic rod part comprises a first section comprising a connecting-rod eye and having a connection thread, and a second section comprising the piston rod, to which a piston is fixedly connected, and having a connection thread.

* * * * *